INVENTOR.
GERHART KRACHT

United States Patent Office 3,233,016
Patented Feb. 1, 1966

3,233,016
PROCESS FOR PREPARING DIMENSIONALLY STABLE STYRENE POLYMER FOAM
Gerhart Kracht, Beaver, Pa., assignor to Koppers Company, Inc., a corporation of Delaware
Filed Nov. 30, 1961, Ser. No. 156,075
4 Claims. (Cl. 264—53)

The present invention has reference to a novel, useful and economical technique for molding low density expandable polystyrene foam parts principally for packaging and cushioning applications.

It has become commonplace to protect fragile items by encasing the item in a container therefor made of foamed polymeric material. Conveniently, the package for the fragile item can be made by heating expandable polymeric particles in a closed but not air-tight mold, whereby the particles fuse together and expand to form the shape of the mold. When this mold is the shape of the item to be enclosed, the plastic article can be removed from the mold, aged, and placed around the item to be protected. The expandable polymeric materials, such as expandable styrene polymers, have worked well in the production of packaging articles of foamed polymeric material for protecting fragile items. Such polymeric material has the advantage of being inexpensive, readily fabricated and having the properties of lightness in weight and excellent cushioning, blocking and bracing properties.

As a general rule, the cushioning properties of the foamed styrene polymer articles improve as the density is decreased. However, the art of molding has been restricted to densities equal to or above one pound per cubic foot. The reason for this restriction is due to the dimensional instability of molded parts which have bulk densities of less than one pound per cubic foot. Water and the expanding agent for the polymeric material condenses in the cells when the molded part cools. At densities of less than one pound per cubic foot, the cell walls, heretofore, have not been strong enough to withstand the vacuum created by this condition causing the molded part to shrink.

The present invention overcomes the foregoing disadvantage by a novel process which permits the molding of foamed styrene polymer articles of densities ranging from 0.25 pound per cubic foot to 1 pound per cubic foot. In accordance with this invention, the molded article is removed from the mold while still hot and placed in an air circulating oven for a period of time, whereby the existing differential pressure between the internal pressure of the beads and the ambient atmospheric pressure is equalized while the article is cooled to ambient oven. Thereafter, when the article is cooled to ambient atmospheric temperature, it maintains close dimensional tolerance as compared to the mold cavity, and the article provides a maximum shock absorption greater than that expected for an article having a density greater than 1 pound per cubic foot.

In the conventional production of an article from expandable styrene polymers, the polymers are first preexpanded to substantially the final size. This may be conveniently carried out in a pre-expander such as described in copending application Serial No. 689,195 of Hugh Rodman, Jr., now Patent No. 3,023,175, patented February 27, 1962. Briefly, this pre-expansion comprises subjecting the particles with agitation but without confinement to a heated atmosphere of steam, whereby the particles expand to from 10–30 times their original size. The expanded particles being lighter in weight move upwardly as a result of the agitation and spill over as partially or pre-expanded particles. These particles are then aged for a period of time from six hours to two days to permit the internal pressure within the beads to be equalized with the external atmospheric air pressure. The aged pre-expanded beads are then fed to a mold of desired configuration. The particles are heated in the mold, for example, by steam to a temperature above the boiling point of the expanding agent but below the melting point of the polymeric particles, whereupon the particles further expand, fuse together to form a foam structure, and assume the configuration of the mold. These particles are then cooled to a self-sustaining condition and removed from the mold.

Protective packaging articles made in accordance with the foregoing conventional process can provide excellent protection for a fragile item, for the packaging article has great energy absorption capacity. The instant invention produces a packaging article that provides even greater shock absorption than has been previously experienced with expanded styrene polymer articles that have a density of greater than one pound per cubic foot.

G factor is the numerical value, expressed in terms of mutiples of acceleration of gravity, of the maximum negative acceleration (deceleration) that a cushion will provide for a cushioned item. The smaller the numerical value of a G factor, the more efficient the cushion. The constant force on the material, expressed as force per unit area ($W/A$), is the dead load.

A force, according to Newton's Second Law, is equivalent to the product of the mass of an item and its acceleration. Thus $F/A$ equals $WG/A$, where F is the force, A is the unit area of cushion receiving the load, W is the weight of the item in pounds, and G is the G factor of the cushion and is dimensionless.

The G factor was determined by dropping an anvil which weighed 0.5 pound and which exerted a dead load of 0.5 pound per square inch on a sample cushion 1 inch square by 2 inches thick. A cathode ray oscilliscope received the response of accelerometers on the anvil and described this response in terms of an acceleration-time trace.

Figure 1:
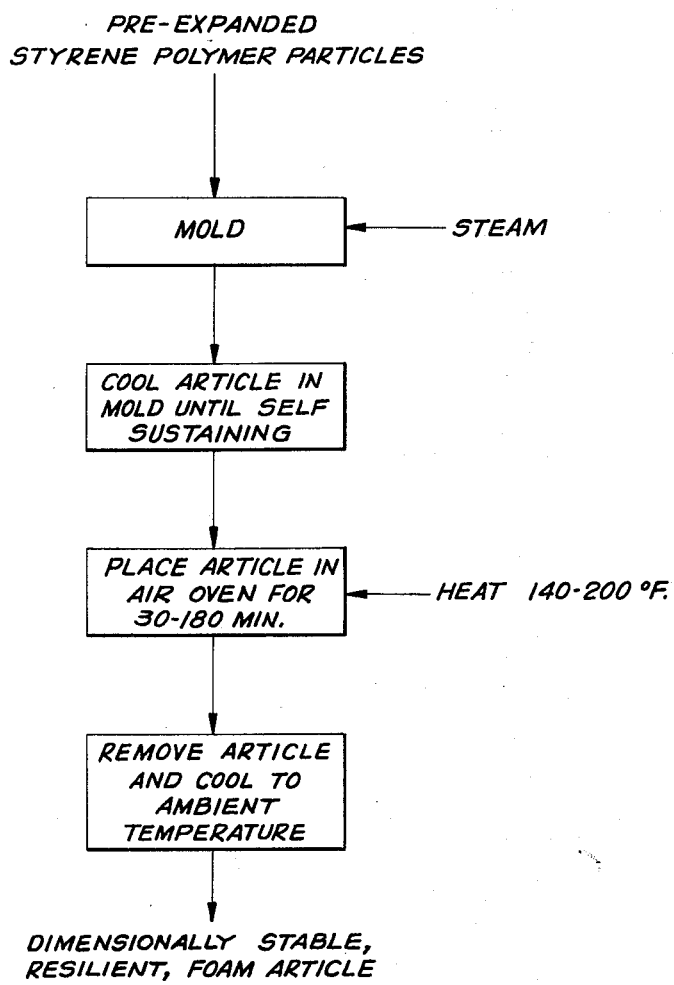
FIG. 1 is a flow diagram illustrating a typical embodiment of the process of the invention.
Figure 2:
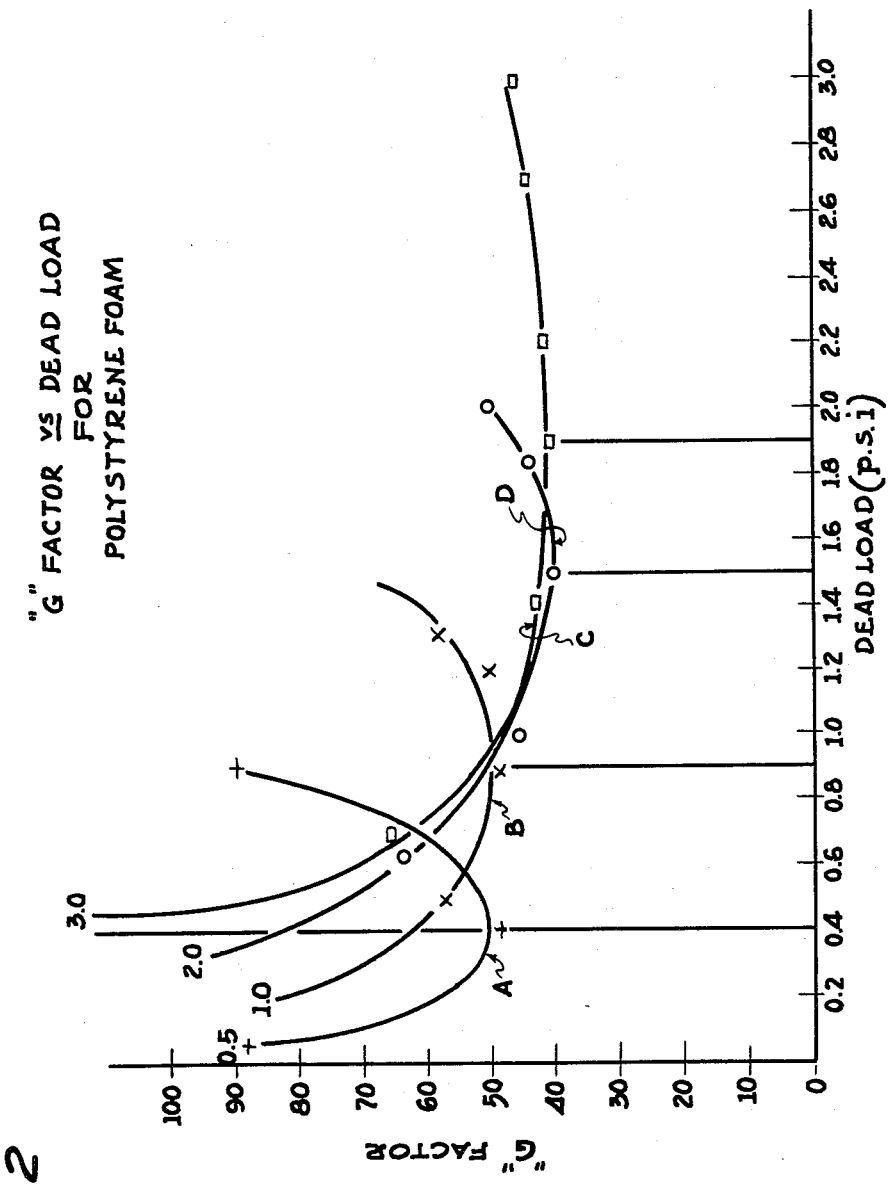
FIGURE 2 illustrates visually the relationship G factor versus dead load for foamed polystyrene of various densities.

FIGURE 2, "G Factor vs. Dead Load," reveals that foam polystyrene whose density is 0.5 pound per cubic foot at a dead load of 0.4 pound per square inch is approximately 25% more efficient than foam polystyrene whose density is 1 pound per cubic foot, 40% more efficient that foam polystyrene whose density is 2 pounds per cubic foot, and over 50% more efficient than foam polystyrene whose density is 3 pounds per cubic foot. For example, FIGURE 2 indicates the optimum dead load for each density to be as follows.

| Density (p.c.f.) | Dead load range (p.s.i.) | G factor |
|---|---|---|
| 0.5 | 0.4 | 50 |
| 1.0 | 0.9 | 48 |
| 2.0 | 1.5 | 40 |
| 3.0 | 1.9 | 41 |

This table indicates that fragile articles exerting a dead load less than 0.9 pound per square inch (for example 0.5 pound per square inch) are more suitably cushioned in polystyrene foam having a density of less than 1 pound per cubic foot.

Other advantages provided by the process of this invention for molding foamed styrene polymer articles whose density ranges between 0.25 to 1.0 pound per cubic foot are:

(1) *Lighter weight parts.*—Since the tare weight of the final package contributes in many cases to the over-all freight cost, it will be advantageous to use a cushioning and packaging medium of the lowest bulk density possible. The novel process of this invention permits the use of molded foam parts whose density is less than 1 pound per cubic foot.

(2) *Lower raw material cost per package.*—Manufacturers and users of packaging materials must, of necessity, operate at extremely low price levels. As the rising costs of packaging, labor, and machinery force costs up, a 50% to 75% reduction in packaging raw material requirements will more than offset this trend. This can be easily accomplished by the use of the present invention.

(3) *Greater elimination of blowing or expanding agent odors.*—In certain packaging cases heretofore, foam polystyrene expanding agent odors emanating from the molded part have been objectionable. The present invention reduces the odor due to residual expanding agent in two ways:

(a) The parts for the cushion may be of a foamed styrene polymer material having a low density, the low density material inherently has a lower level of expanding agent because so much of the expanding agent is consumed in the expanding operation; and (b) The heat treatment after the expansion accelerates the release of a residual expanding agent since the high temperature of this treatment reduces the expanding agent characteristics and increases its fugitive nature. Thus, three hours after a cushioning article has been molded and treated in accordance with this invention, the residual expanding agent is less than 2% and 24 hours later the residual content has not changed.

(4) *Decreased cooling cycles.*—The greatest obstacle in the rapid production of molded articles of foamed styrene polymers is the length of time required in the cooling cycle, that is, the time required to cool the article sufficiently for it to be a self-sustaining structure. It is common knowledge in the molding industry that as the foam polystyrene density is decreased the cooling interval is decreased. For example, the cooling cycle for a foamed styrene polymeric structure whose density is 1 pound per cubic foot can be expected to be 25% to 50% longer than for a foamed styrene polymeric structure whose density is 0.5 pound per cubic foot. Accordingly, molded articles that will have foamed styrene polymeric structures of low densities, as provided for in this invention, will afford higher production rates, lower molding equipment requirements and, therefore, lower labor costs per article.

(5) *Friction fit packaged article.*—By controlling the temperature to which the article is subjected during the heat treating step to temperatures of from 175 to 200° F., the dimensional tolerances of the molded part can be altered to provide for a minimum tolerance between the molded foam part and the article to be cushioned or packaged. This will provide for a maximum utilization of the foam polystyrene cushioning properties.

(6) *Reduced molded parts storage requirements.*—In the past, molded polystyrene foam parts required a 24 hour aging period to provide for optimum cushioning properties. During this period of time, ambient air permeates the cells. The novel process of this invention accelerates the aging period by approximately 90% as the air permeates the cell walls at a greater rate at the higher temperatures during the heat treating period. Consequently, the molded part storage area required is reduced by approximately 90%.

(7) *Dry molded polystyrene foam parts.*—In the past, molded polystyrene foam parts required at least 24 hours to reduce the residual moisture content. This novel process of this invention accelerates the evaporation rate of residual moisture on the foam part by 90%. The most important advantage in this technique is the realization of dry molded foam articles of low density (0.25 to 1 pound per cubic foot) which are dimensionally stable. This has not been possible heretofore as molded foam articles which had densities of less than 1 pound per cubic foot have tended to shrink and deform on cooling. In addition, molded foam parts could not be used immediately in the manufacturing packaging line because of the inherent moisture contained in the part which would cause a corrosive effect on certain articles.

In accordance with this invention, the protective article is removed from the mold while still hot (e.g. temperature on surface of molded part is approximately 100–120° F.; temperature in center of molded part is approximately 190–220° F.) that is, while the article has cooled sufficiently to be in a self-sustaining condition but has not yet reached ambient atmospheric temperature. The article is then placed in an air circulating oven at a temperature of from about 140–200° F. with an optimum temperature being about 160° F. (at a higher temperature, 175° F., material post-expands; at a lower temperature, 140° F., material shrinks because of insufficient internal bead pressures) for about three hours. The time depends on the wall thickness of the molded part, e.g. a 12 x 12 x 12 inch thick part requires approximately three hours; a 12 x 12 x 1 inch thick part requires approximately thirty minutes. The article is then removed from the oven and cooled to room temperature.

It has been found, surprisingly, that articles which have been subjected to the novel process of this invention have high cushioning qualities. Packages made from such an article can be used for enclosing, for example, delicate electronic equipment, for the other fragile articles which are subject to packaging.

As an example of the invention, expandable polymeric particles, sold under the trade name "Dylite" and having about 9% by weight of a low boiling aliphatic hydrocarbon incorporated therein, were pre-expanded with steam and agitation to prevent agglomeration to a bulk density of 0.75 pound per cubic foot. Two cubical molds measuring 12 x 12 x 12 inches were filled with the pre-expanded expandable polystyrene. The beads were then heated by the injection of steam therein to cause the beads to coalesce and fuse together yielding two blocks having cubical dimensions of 12 inches. One block was removed from the mold while it was still hot but was cool enough to be in a self-sustaining condition and lettered Block A. Block A was immediately placed in an oven at 160° F. and allowed to remain there for 3 hours. The other block was removed from the mold after the mold had cooled to almost room temperature and was lettered Block B. At the end of 24 hours, Blocks A and B were measured. It was found that Block A was substantially dimensionally stable having shrunk only 1/64 of an inch. On the other hand, Block B had shrunk along a dimension of from 3/4 to 1 inch per foot.

It is claimed:

1. A process for preparing dimensionally stable styrene polymer foam which comprises heating expandable styrene polymer particles under restraint, whereby the particles coalesce and fuse together to form a foamed structure showing discrete particles, cooling the structure to a temperature at which the structure is self-sustaining and above ambient atmospheric temperature, said structure being substantially fully expanded and thereafter maintaining the structure in air at an elevated temperature below that at which the structure postexpands and above that at which the structure shrinks until the pressure within the structure has equalized itself with the ambient atmospheric pressure such that the vacuum within said structure is eliminated.

2. A process for preparing dimensionally stable styrene polymer foam of a density less than one pound per cubic foot which comprises heating expandable styrene polymer particles under restraint, whereby the particles coalesce and fuse together to form a foamed structure having discrete particle cells, cooling the structure to a temperature at which the structure is self-sustaining and above ambient atmospheric temperature said structure being substantially fully expanded, and thereafter maintaining the structure in air at an elevated temperature of 140° F. to 200° F. for a period of 30 to 180 minutes until the pressure within the cell wall has equalized itself with the ambient atmospheric pressure such that the vacuum within said cell wall is eliminated.

3. A process for enhancing the cushioning properties of styrene polymer foam that is foamed by heating expandable styrene polymer particles in a mold until the particles coalesce and fuse together which comprises removing the styrene polymer foam from the mold when the foam has cooled to a temperature where the structure is self-sustaining, and above room temperature, said structure being substantially fully expanded and thereafter maintaining the structure in air at an elevated temperature between about 140° and 200° F. until the pressure within the cells of the foam has become substantially the ambient atmospheric pressure such that the vacuum within said cells is eliminated.

4. A process for enhancing the cushioning properties of styrene polymer foam that is made by heating expandable styrene polymer particles in a mold of desired configuration, which process comprises removing the foam from the mold when the foam has cooled to a temperature at which the foam is self-sustaining and above about 100° F., said foam being substantially fully expanded and thereafter maintaining the structure in air at a temperature of 160° F. for a period of 30 to 180 minutes such that the vacuum within said structure is eliminated.

References Cited by the Examiner
UNITED STATES PATENTS

| | | | |
|---|---|---|---|
| 2,774,991 | 12/1956 | McCurdy et al. | 264—53 |
| 2,787,809 | 4/1957 | Stastny | 264—53 |
| 2,857,625 | 10/1958 | Carlson | 264—53 |
| 3,023,175 | 2/1962 | Rodman | 260—2.5 |
| 3,058,162 | 10/1962 | Brabowski | 18—483 |
| 3,082,483 | 3/1963 | Bickford | 264—321 |

OTHER REFERENCES

BASF translation of Stastny, Fritz: Molds and Fixtures for Styropor Fabrication, pp. 11–12. (Reprinted from Der Plastverarbeiter 5, No. 9 12 pp. (1954).)

Stastny, Fritz: "New Method for the Fabrication of Styropor," BASF booklet, pp. 23–24. (Reprinted from Der Plastverarbeiter, 7, 242–250 (1955).)

Plastics Engineering Handbook of the Society of The Plastics Industry, Inc., Third Edition, Rheinhold Publishing Corp., New York, page 192, copyright 1960.

ALEXANDER H. BRODMERKEL, *Primary Examiner.*

LEON J. BERCOVITZ, *Examiner.*

M. FOELAK, P. E. ANDERSON, *Assistant Examiners.*